United States Patent [19]

Barrus et al.

[11] Patent Number: 5,717,428
[45] Date of Patent: *Feb. 10, 1998

[54] PORTABLE COMPUTER KEYBOARD FOR USE WITH A PLURALITY OF DIFFERENT HOST COMPUTERS

[75] Inventors: Joseph P. Barrus, San Jose; Ketan D. Kothari, Sunnyvale, both of Calif.

[73] Assignee: Intelligent Peripheral Devices, Inc., San Jose, Calif.

[*] Notice: The term of this patent shall not extend beyond the expiration date of Pat. No. 5,410,305.

[21] Appl. No.: 398,355

[22] Filed: Mar. 3, 1995

Related U.S. Application Data

[63] Continuation-in-part of Ser. No. 912,163, Jul. 10, 1992, Pat. No. 5,410,305.

[51] Int. Cl.$^6$ ............................................. G09G 5/00
[52] U.S. Cl. ............................................. 345/168; 341/27
[58] Field of Search ............................................. 345/168, 169, 345/172; 341/21, 22, 24, 23; 400/487, 489, 486

[56] References Cited

U.S. PATENT DOCUMENTS

| | | | |
|---|---|---|---|
| 4,143,417 | 3/1979 | Wald et al. | 364/900 |
| 4,394,649 | 7/1983 | Suchoff et al. | 340/711 |
| 4,558,315 | 12/1985 | Weiss et al. | 340/802 |
| 4,908,612 | 3/1990 | Bromley et al. | 340/706 |
| 4,928,094 | 5/1990 | Smith | 340/712 |
| 5,065,360 | 11/1991 | Kelly | 395/800 |
| 5,410,305 | 4/1995 | Barrus et al. | 345/168 |
| 5,450,078 | 9/1995 | Silva et al. | 341/23 |

OTHER PUBLICATIONS

The Trine System, A Journeyer's Guide to the Trine System, Copyright 1985 by the Trace Research and Development Center on Communication, Control and Computer Access, Madison, WI 53705.

Prentke Romich Company, 1984 Suggested Price List, Shreve, OH.

Practical Application of Microcomputers to Aid the Handicapped, Gregg C. Vanderheiden, Jan. 1981, Computer, Trace Research and Development Center, University of Wisconsin, Madison, WI, pp. 1–8.

Computers Can Play a Dual Role for Disabled Individuals, Gregg Vanderheiden, Sep. 1982, BYTE Publications Inc., Trace Research and Development Center, Madison, WI, pp. 136–162.

The Data Routing Module: Accessing Computer Systems with Communication Aids, Rodgers and Kelso, 1983 Trace R&D Center, Univ. of Wisconsin, Madison, WI, pp. 1–3.

(List continued on next page.)

*Primary Examiner*—Regina D. Liang
*Attorney, Agent, or Firm*—Gardner, Carton & Douglas

[57] ABSTRACT

Disclosed is a portable computer keyboard capable of operation in three distinct modes: stand-alone mode, automatic mode and a conventional mode. In stand-alone mode, information entered is stored in an on-board memory buffer, and may be edited by using a set of predetermined editing keys in conjunction with a display mounted on the device. In automatic mode, the contents of the on-board memory buffer are transmitted, by a keystroke emulation technique, to an attached host computer via a conventional keyboard connector cable. In the conventional keyboard mode, keystrokes entered are transmitted directly to an attached host computer. The keyboard of the invention may be operated in connection with a plurality of different host computers, and includes host detection and host identification to facilitate operation with such a plurality of different host computers. Also disclosed is a power conservation technique where the device enter a dwell or sleep mode when waiting to process keystrokes.

29 Claims, 6 Drawing Sheets

OTHER PUBLICATIONS

A Portable Computer–Based Writing, Conversation and Computer Access Aid for Severely Motor Impaired Individuals, Gunderson and Vanderheiden, 1984, Trace Center, Univ. of Wisconsin, Madison, WI.

A High–Efficiency Flexible Keyboard Input Acceleration Technique: Speedkey, Gregg Vanderheiden, 1984, Trace R&D Center, Univ. of Wisconsin, Madison, WI, pp. 1–2.

Generic Keyboard Emulator Architecture for Transparent Access to Standard Software by Handicapped Individuals, Kelso and Gunderson, Trace R&D Center, Univ. of Wisconsin, Madison, WI, 1984, pp. 10–11.

Alternate Access to all Standard Computers for Disabled and Non–Disabled Users, Gregg Vanderheiden, 1985, Trace R&D Center, Waisman Center, pp. 33–35.

Design of Universal Keyboard Emulators, Barry Rodgers, 1985, Trace R&D Center, Univ. of Wisconsin, Madison, WI, p. 27.

Use of Transparent Input and Feedback Modification to Allow Access to Standard Educational and Vocational Software, Vanderheiden and Kelso, 1985, Trace R&D Center, Univ. of Wisconsin, Madison, WI.

Dual and Nested Computer Approach to Vocational and Educational Computer Systems, Vanderheiden and Kelso, 1985, Trace R&D Center, Univ. of Wisconsin, Madison, WI.

Ten–Branch Abbreviation Expansion for Greater Efficiency in Augmenttive Communication Systems, 1985, Kelso and Vanderheiden, Trace R&D Center, Univ. of Wisconsin, Madison, WI, p. 26.

Alternative Access Methods for the IBM Family of Personal Computers and True Compatibles, Leslie Dolman & Sherrill Meeks, RESNA 10th Annual Conference, San Jose, CA, 1987, pp. 678–679.

The Portable Computer Keyboard, May 1983, Popular Computing, p. 142.

TETRA ScanII/Scan Writer Computer Keyboard Emulators, 1983, Zygo Industries, Inc., Portland, OR pp. 1–6.

Trace Center International Software/Hardware Registry, 1983, Programs and Modifications Created or Adapted for Use by handicapped Individuals, University of Wisconsin––Madison.

Trace Center International Software/Hardware Registry, Second Edition, 1984, Programs and Modifications Created or Adapted for Use by Handicapped Individuals, Univ. of Wisconsin, Madison, WI.

Keyboard Emulation Using NRCC's MOD Keyboard, Korba, Nelson and Park, 1984, National Research Council of Canada, Ottawa, Canada, 2nd Int'l Conference on Rehabilitation Engineering, Ottawa.

The Effect of Increased Sensor Area on Input Rate and Accuracy of the Express III Communication Aid, Lee and Vanderheiden, 1985, Trace R&D Center, RESNA 8th Annual Conference, Memphis, TN, pp. 128–130.

A Direct Access Expanded Keyboard for the Talkiong Blissapple, Graystone, Kelso, Rodgers and Vanderheiden, School of Rehabilitation Medicine, Vancouver, Canada, Trace R&D, Madison, WI, 1983.

Proceedings, The IEEE Computer Society Workshop on Computing to Aid the Handicapped, Nov. 1982, IEEE Computer Society, Los Angeles, CA, pp. 77–81.

Keyboard Equivalent for Mouse Input, Lee and Vanderheiden, Trace R&D Center, Waisman Center, Madison, WI, pp. 711–713, RESNA 10th Annual Conference, San Jose, CA, 1987.

One Flager Operation of the IBM Family of Personal Computers, Lee, Vanderheiden and Rasmussen, Trace R&D Center, Madison WI.

A Multifunction Alternative Computer "Keyboard" for the Physically Handicapped Using Headpointing Techniques, Gunderson, Kelso and Vanderheiden, 1982, Trace R&D Center, Madison, WI, pp. 77–81.

Accessible Computers from the Box, Vanderheiden, Trace R&D Center, Madison, WI, pp. 1–4, Charts 1 of 4, 3 of 4 (Jul. 1987).

Proceedings of the Seventh Annual Conference of the IEEE Engineering in Medicine and Biology Society, Sep. 1985, IEEE Service Center, Piscataway, NJ.

Development of a Set of International Communication Aids Compatibility Standards Proposals (ICAC STDS Rodgers & Gunderson, 1984, Trace Center, Univ. of Wis. Madison, WI, 2nd Int'l Conf. on Rehab. Eng.

Curbcuts and Computers: Providing Access to Computers and Information Systems for Disabled Individuals, Venderheiden, Speech, Oct. 13, 1983, Trace R&D Ctr, Univ. of Wisconsin, Madison, WI.

Features to Increase the Accessibility of Computers by Persons with Disabilities: Report from the Industry Government Task Force, Vanderheiden, Lee & Scadden, Trace R&D Center, Madison, WI, pp. 750–752.

Interfacing Computers for the Physically Handicapped—A review of International Approaches, Raitzer, Vanderheiden and Holt, National Computer Conference 1976, Univ. of Wisconsin, Madison, WI, p. 209.

PORTABLE COMPUTER KEYBOARD FOR USE WITH A PLURALITY OF DIFFERENT HOST COMPUTERS

This is a continuation-in-part of application Ser. No. 07/912,163, filed Jul. 10, 1992 which is now U.S. Pat. No. 5,410,305.

FIELD OF THE INVENTION

The present invention relates generally to computer keyboards, and more particularly to a portable computer keyboard capable of stand-alone, automatic and host modes of operation with plurality of different host computers.

BACKGROUND OF THE INVENTION

Personal computer systems have had a pervasive impact on the educational system in the United States. Even in grammar schools and high schools, several personal computer systems are a common educational tool used in the classroom. Although the cost of a personal computer system has dropped dramatically in recent years, the ratio of students to computers is still great. As a result, there is only limited time for a student to operate a computer system, in order for each student to get an opportunity to use the limited number of computer systems typically made available in public schools in the United States. Much of the time a student spends using a personal computer system in the classroom is devoted to entering text in preparation of a homework assignment, such as a paper or report.

It is a general object of the present invention to provide a method and apparatus for dramatically reducing the amount of time a computer system is used merely for entering a mass of text or data.

It is another object of the present invention to provide such a method and apparatus whereby a mass of text or data to be stored or processed by a computer may be initially input directly into a keyboard unattached to the computer system.

Another object of the invention is to provide such an apparatus and method that is portable, inexpensive and capable of use with a plurality of different host computers.

The above objects are realized in the present invention which provides a portable computer keyboard capable of operation in three distinct modes. The keyboard of the invention may be operated in a stand-alone mode unattached to a computer system, wherein information entered in the form of keystrokes is stored into a memory buffer contained within the device itself.

A second mode of the invention involves operation of the keyboard device as a conventional keyboard when attached to a host computer. In this mode, individual keystrokes are transmitted directly from the keyboard device to a computer system via a conventional keyboard input receptacle.

A third mode of operation of the keyboard of the present invention is an automatic mode, where information previously stored in the keyboard data buffer is automatically transmitted to an attached computer system via a conventional keyboard input receptacle.

In accordance with an important aspect of the invention, the stand-alone mode may be enhanced by providing the keyboard device with a small display, such as a 4-line, 80-column liquid crystal display. In addition, editing functions may be implemented whereby text or other data stored in the keyboard buffer may be selectively viewed or edited, while the device is operated in a stand-alone mode.

An important aspect of the present invention is the recognition of the computer keyboard input receptacle as a fundamental and standard means for transferring information to the computer system. Conventional communication and data transfer techniques are typically cumbersome, require additional hardware and need to be configured for a specific protocol. In contrast, by emulating the signals generated by a conventional computer keyboard, the present invention may advantageously transmit information from an on-board data buffer to a computer through a standard keyboard input receptacle, without any additional hardware and without requiring configuration of the host computer to accept a particular communication protocol.

In addition, in accordance with a preferred embodiment, the portable computer keyboard of the present invention may be used with a plurality of different host computers. Thus, the keyboard operates according to one of a plurality of different protocols when operating in the automatic mode and when operating in the conventional mode, the keyboard determines the type of host computer to which it is connected, and in response thereto, operates according to the appropriate keystroke emulation protocol corresponding to the type of host computer.

BRIEF DESCRIPTION OF THE DRAWINGS

Other objects and advantages of the invention will be apparent from the following detailed description and the accompanying drawings, in which.

While the portable computer keyboard of the present invention will be described in detail in connection with a specific embodiment for use in conjunction with either a Macintosh host computer system or an IBM PC type host computer system, it will be understood that the invention is not intended to be limited to such a use. On the contrary, the invention is easily adapted for use in conjunction with virtually any type of host computer system that includes a computer keyboard input receptacle. Thus, the following description is intended to cover all alternatives, modifications and equivalents falling within the spirit and scope of the invention as defined by the appended claims.

DETAILED DESCRIPTION OF THE INVENTION

Figure 1:
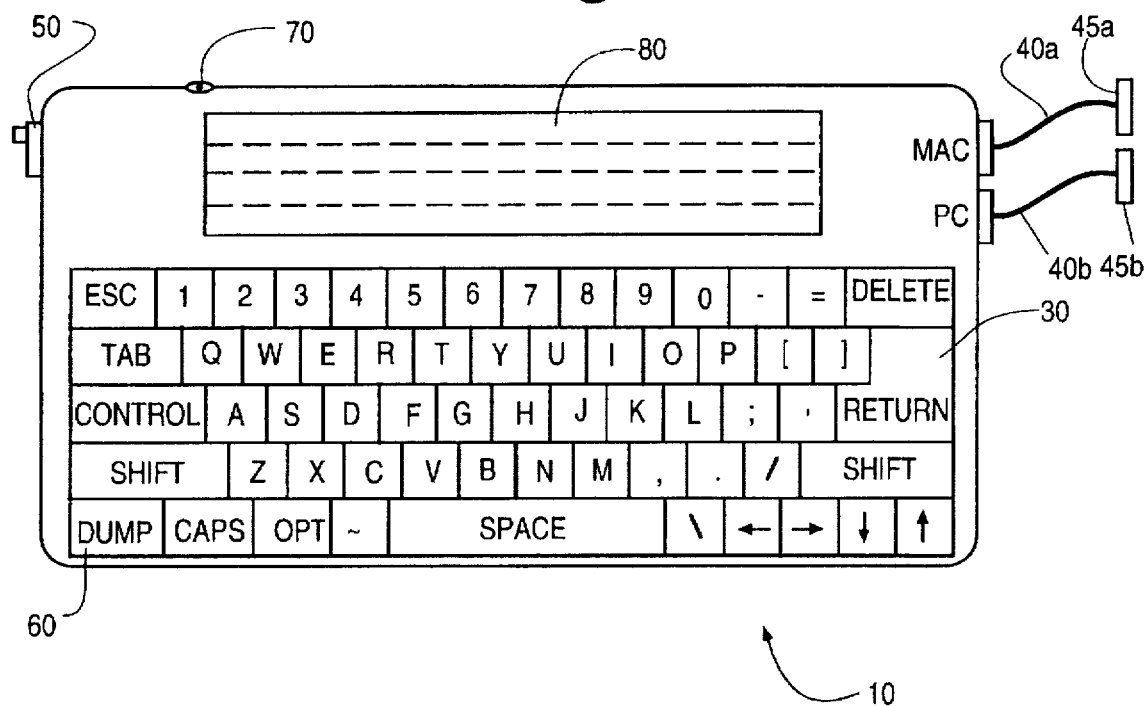
FIG. 1 is a top view of the present invention.

As depicted in FIG. 1, the portable computer keyboard 10 of the present invention has an external appearance very similar to that of a conventional computer keyboard. The device includes an outer shell 20 or casing, a standard computer keypad 30.

The external appearance of the device, however, differs from that of a conventional keyboard in several respects. Most notably, the device includes two, rather than one, different keyboard connector cables 40a and 40b. The pair of keyboard connector cables 40a and 40b each have a corresponding plug 45a and 45b, respectively, to attach the device to two different types of host computer systems. According to the illustrated embodiment, one of the keyboard connector cables 40a is provided to connect the device to a Macintosh type host computer system, while the other connector cable 40b is to use the device when connected to PC type host computer system. As will be understood by one of ordinary skill in the art, two separate connector cables are necessary because the physical configuration of the keyboard input receptacle for the Macintosh and the PC are different. Likewise, the physical configuration of the Macintosh connector cable 40a and the PC connector cable 40b is different. It should be noted, however, that according to an alternative embodiment of the invention a single connector cable could be used to attach the device to several different type of host computer systems, provided that the physical configuration of the keyboard input receptacle for those systems is the same. In such an embodiment, certain electrical characteristics relating to the keyboard connector cable connector will be unique to the particular type of host computer system, thereby providing a means for detecting which type of host computer system to which the device is connected.

The device includes the unique features of a power switch 50, in order to turn the device on or off while operating unattached to a computer system. The device preferably includes a specific "dump" or "transmit" key 60 designated to initiate the automatic transfer of data, such as text stored by the device, to an attached computer system via the keyboard connector cable 40. Preferably, the device will also include a jack 70 to receive a standard AC/DC adapter, as well as a compartment (not shown) to hold and connect a set of on-board batteries to power the unit during stand-alone operation.

According to a preferred embodiment of the invention, the device also includes a small display 80, such as a 4-line, 80-column LCD display panel (or, perhaps, a 4-line, 40-column LCD display panel) disposed on the front surface of the shell 20. The display 80 allows a user to conveniently view and edit information entered and stored in the memory buffers of the device when operated in remote mode, unattached to a host computer system. The display 80 also serves to prompt the user during operation of the device, particularly when initiating or terminating a data transfer session with an attached host computer.

Figure 2:
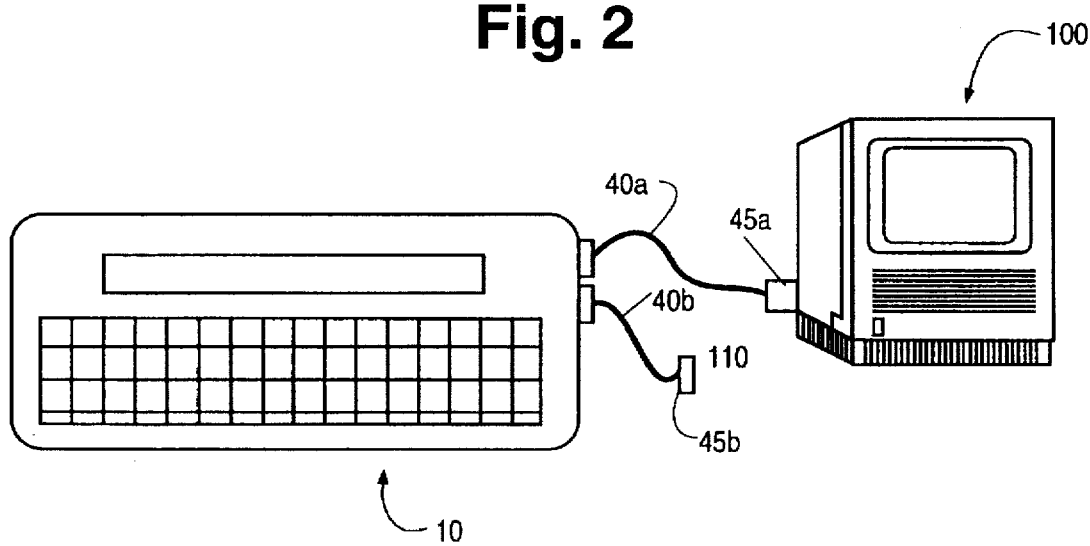
FIG. 2 is a perspective view of the present invention illustrating operation in conjunction with one type of a conventional host computer system.

As shown in FIG. 2, the portable computer keyboard device 10 of the present invention may be attached to a host computer system 100 by simply inserting the appropriate keyboard connector cable plug 45a into the keyboard input receptacle 110 of the host computer 100. As illustrated in FIG. 2, the device illustrated is connected to a Macintosh type host computer using the using Macintosh type connector cable plug 45a.

As will be described in greater detail later, of the three distinct modes of operation of the device of the present invention, two modes—the conventional keyboard mode and the automatic data transfer mode—require connection of the device to a host computer, while one mode—stand-alone mode—may be performed while the device is unattached to a host computer. According to a preferred embodiment, the invention may be operated by battery power, particularly when operated in stand-alone mode. In addition, the device may be alternatively powered by an external DC power supply, such as by a conventional AC/DC adapter. However, when the device is attached to a host computer, it may derive its power in a conventional manner from the keyboard connector cable 40.

Figure 3:
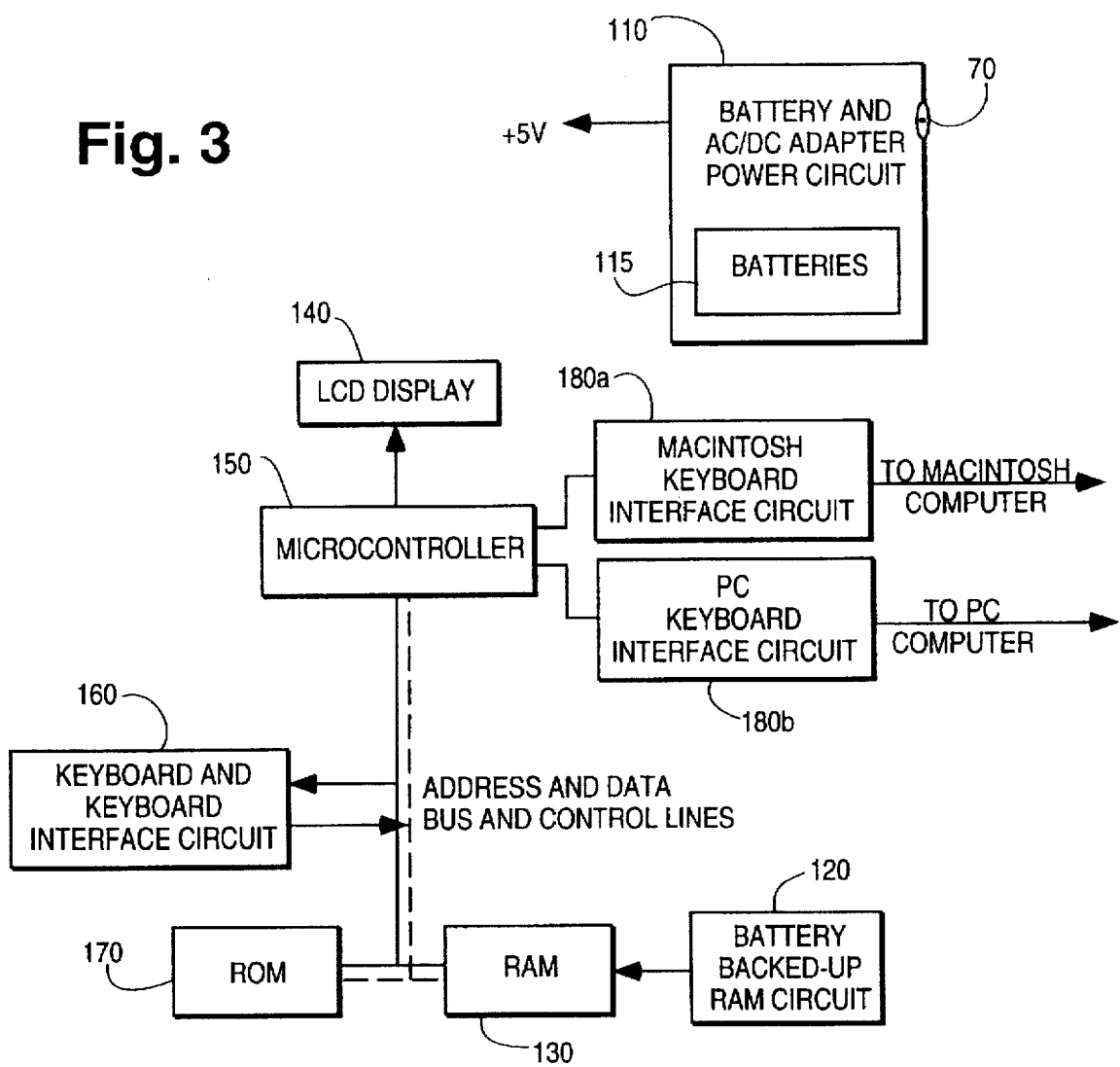
FIG. 3 is a functional block diagram illustrating the general features of a portable computer keyboard in accordance with the present invention.

Referring to FIG. 3, there is shown a block diagram depicting the various internal features of the keyboard of the present invention. The device is powered by either a number of batteries 115 stored in a compartment in the device, an AC/DC adapter, or the power of a connected host computer via the keyboard connector cable. The particular power source 110 used may be selected according to which source provides the highest voltage. Alternatively, a more sophisticated technique may be used where the power source selected is the host computer via the keyboard connector cable, if connected. If not connected, then the power source selected is the AC/DC adapter, if connected. Otherwise, power will be provided by the batteries. This more sophisticated technique will conserve battery power in the event another essentially unlimited power source is available.

In addition to power for the device itself, there is preferably provided a separate backup battery power source 120 for the device's RAM memory 130. This source 120 preserves the contents of the RAM memory 130 in the event all the other power sources from the device are absent. It should be understood that the RAM backup power source 120 does not operate any part of the device, and is only intended to preserve the information stored in the RAM memory 130 until another power source is provided to operate the device.

The device preferably includes a display 140 in order to prompt the user and display at least a portion of the contents of the information stored in the RAM memory 130. Such a display is particularly useful to view information when editing information stored in the RAM memory 130 during stand-alone operation.

The device also includes a number of conventional keyboard components such as a microcontroller 150, keyboard and keyboard interface circuitry 160, ROM memory 170 and RAM memory 130. In order to use the device with either a Macintosh type host computer or a PC type host computer, there is provided a Macintosh type host computer keyboard interface circuit 180a and a PC type host computer keyboard interface circuit 180b. As can be seen, one advantageous aspect of the invention is that it may rather readily be produced by adapting a conventional keyboard device.

Figure 4:
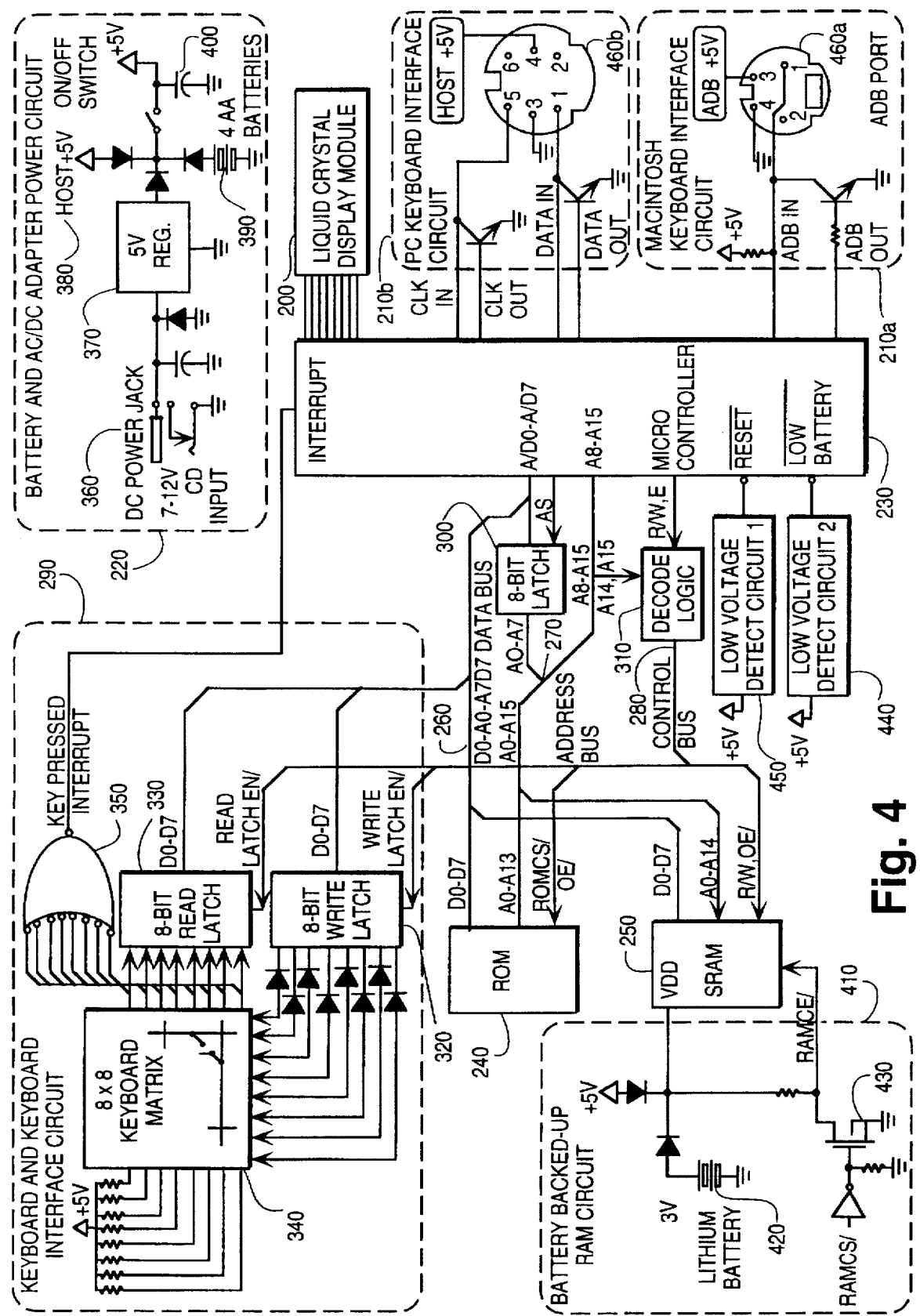
FIG. 4 is a schematic diagram of the electronic circuitry of a preferred embodiment of the present invention.

Turning now to FIG. 4, there is shown a detailed schematic diagram of an embodiment of the invention where the device is adapted to operate in conjunction with either a Macintosh type host computer system or a PC type host computer system. In the illustrated embodiment the Macintosh type keyboard interface circuit operates according to the Apple Desktop Bus (ADB) protocol for transmitting information from the device to an attached Macintosh type host computer, while the PC type keyboard interface circuit operates according to the conventional protocol for keyboards for a PC type computer system. The illustrated embodiment uses a 4-row, 80-column LCD display 200. An LCD-type display is preferred for this application because of its characteristics of relatively low power consumption and price. It should be understood that these particular features are depicted in conjunction with the illustrated embodiment in order to more readily describe operation and one possible design of the invention. It is not intended that the invention be limited to the specific features depicted, rather it is intended that the various features, elements and design of the illustrated embodiment may be altered, or modified to provide a device with similar functional characteristics of the illustrated embodiment.

For example, an ADB protocol and the PC type protocol have been selected to interface the device with an attached host computer of the Macintosh variety manufactured by Apple Computer, Inc. or a PC type host computer produced by a number of different manufacturers. However, the illustrated host computer keyboard interface circuitry 210 may be readily modified to provide a device with yet even another different protocol that will enable transmission of data to a different family of computers with a different type of keyboard interface protocol. Similarly, one particular power circuit 220 design is illustrated that includes three alternate sources of power for the device. However, one or even two of these power sources may be removed, if desired, to provide a similar device that still operates in accordance with the general function and design of the present invention.

Operation and control of the device is carried out primarily by a microcontroller 230 that reads instructions stored in the ROM memory 240. The device includes RAM memory 250 for storage of information entered by the user and to store program variables used by the microcontroller 230 during execution. The microcontroller 230, RAM memory 250 and ROM memory 240 are functionally connected by a data bus 260, an address bus 270 and a control bus 280. The keyboard interface circuitry 290 is similarly connected, with the exception that, according to the illustrated embodiment, connection with the address bus 270 is not necessary. Data entered by the keyboard may be read from the keyboard interface circuitry 290 using only the control and data buses 260.

The microcontroller 230 of the illustrated embodiment multiplexes the first 8 bits comprising the data bus 260. This is a conventional technique used among a variety of microcontrollers in order to reduce the number of physical pins on the chip. In order to properly decode the address and data information from the microcontroller 230, an 8-bit latch 300 is provided which is controlled by the AS line of the microcontroller 230. When the microcontroller 230 sets the address lines 270, the AS line enables the 8-bit latch 300, which captures and holds the first 8-bits of the address bus 270 from the common address and data lines from the microcontroller 230. When data is written or received, the AS line disables the 8-bit latch 300, functionally disconnecting the latch from the microcontroller 230. The latch 300, however, continues to hold the first 8-bits that comprise the lower half of the address bus 270.

Selection and control of the various elements of the circuit is accomplished using a control bus 280. In the illustrated embodiment, the control bus 280 is comprised of five lines, each of which provides a distinct signal: Random Access Memory Chip Select (RAMCS), Read Only Memory Chip Select (ROMCS), Output Enable (OE), Read Latch Enable (RLE) and Write Latch Enable (WLE). The control bus 280 information is derived from the two highest address lines (A14, A15) and the Read/Write (R/W) and Enable (E) signal from the microcontroller 230. These four lines from the microcontroller 230 are supplied to a control bus decoder 310 which generates signals on the five control bus lines, RAMCS, ROMCS, OE, RLE and WLE, according to the following logic table:

| A15 | A14 | R/W | E | * | RAMCS | ROMCS | OE | RLE | WLE |
|-----|-----|-----|---|---|-------|-------|----|-----|-----|
| 0 | 0 | 0 | 0 | * | 0 | 1 | 1 | 1 | 1 |
| 0 | 0 | 0 | 1 | * | 0 | 1 | 1 | 1 | 1 |
| 0 | 0 | 1 | 0 | * | 0 | 1 | 1 | 1 | 1 |
| 0 | 0 | 1 | 1 | * | 0 | 1 | 0 | 1 | 1 |
| 0 | 1 | 0 | 0 | * | 0 | 1 | 1 | 1 | 1 |
| 0 | 1 | 0 | 1 | * | 0 | 1 | 1 | 1 | 1 |
| 0 | 1 | 1 | 0 | * | 0 | 1 | 1 | 1 | 1 |
| 0 | 1 | 1 | 1 | * | 0 | 1 | 0 | 1 | 1 |
| 1 | 0 | 0 | 0 | * | 1 | 1 | 1 | 1 | 0 |
| 1 | 0 | 0 | 1 | * | 1 | 1 | 1 | 1 | 0 |
| 1 | 0 | 1 | 0 | * | 1 | 1 | 1 | 0 | 1 |
| 1 | 0 | 1 | 1 | * | 1 | 1 | 0 | 0 | 1 |
| 1 | 1 | 0 | 0 | * | 1 | 0 | 1 | 1 | 1 |
| 1 | 1 | 0 | 1 | * | 1 | 0 | 1 | 1 | 1 |
| 1 | 1 | 1 | 0 | * | 1 | 0 | 1 | 1 | 1 |
| 1 | 1 | 1 | 1 | * | 1 | 0 | 0 | 1 | 1 |

Through the signals the microcontroller 230 supplies to the control bus decoder 310, which in turn supplies decoded signals to the various elements of the circuit through the control bus 280, the microcontroller 230 may select between the RAM, ROM, Read Latch or Write Latch. In addition, by asserting the OE line, the microcontroller may read the contents of either the ROM or RAM, depending on whether the ROMCS or RAMCS is asserted, respectively.

As will be evident to one of skill in the art from the foregoing logic table, the RAM memory 250 is read and written in the address range $0000 through $7FFF, the ROM memory 240 is read in the address range $C000 through $FFFF, the Write Latch 320 is written in the address range $8000 through $BFFF and the Read Latch 330 is read in the address range $8000 through $BFFF.

In order to write a byte of information to the Write Latch 320 to scan the keyboard matrix 340, the WLE line is asserted, thereby enabling the Write Latch 320, and the data bus 260 is used to supply the Write Latch 320 with a new byte of data from the microcontroller 230. Similarly, in order to read a byte of data from the Read Latch 330 during a scanning operation of the keyboard matrix 340, the RLE line is asserted, thereby enabling the Read Latch 330, and the byte of data stored in the Read Latch 330 is then read by the microcontroller 230 from the data bus 260.

If information is to be read from the ROM 240, the address bus 270 is set to the particular ROM address to be accessed, the ROMCS line is asserted along with the OE line, and the addressed byte is read by the microcontroller 230 from the data bus 260.

In order to read information from the RAM memory 250, the address bus 270 is set by the microcontroller 230, the RAMCS and OE lines are asserted, and the addressed byte of data stored in the RAM memory 250 is read by the microcontroller 230 from the data bus 260. Data may be written to the RAM memory 250 by setting the address bus 270, asserting the RAMCS line and de-asserting the OE line, and writing, to the addressed location in the RAM memory 250, the data on the data bus 260 supplied by the microcontroller 230.

The device of the present invention includes a keyboard interface circuit 290 that monitors a keyboard switch matrix 340 and, when scanned by the microcontroller 230, produces signals corresponding to any key depressed on the keyboard. The keyboard interface circuitry 290 includes a conventional keyboard switch matrix 340, such as the 8×8 matrix depicted in the illustrated embodiment. In order to scan the keyboard switch matrix 340 to detect any depressed keys, an 8-bit Write Latch 320 and an 8-bit Read Latch 330 are provided.

In accordance with a preferred embodiment of the invention a multiple input OR-gate 350 is provided that detects, without scanning the keyboard switch matrix 340, when a key has been depressed. In response to detection of a keystroke, the OR-gate 350 generates a signal supplied to an interrupt input of the microcontroller 230. As will be described in greater detail later, in response to receiving such an interrupt signal from the OR-gate 350, the microcontroller 230 commences a scanning sequence of the keyboard switch matrix 340 to determine which key was depressed.

The interrupt feature of the keyboard interface circuit 290 is an important feature of the present invention, in that it allows the microcontroller 230 to operate in an extremely low power mode while waiting for additional information to process from the keyboard switch matrix 340. In contrast to a conventional keyboard that, when in use, is powered by a virtually unlimited power source from an attached host computer via the keyboard connector cable, the present invention, which is intended for prolonged use unattached to a host computer, preferably includes power conserving features to preserve the limited power available from on-board batteries. Accordingly, the interrupt feature of the present invention allows the microcontroller 230 to operate or "sleep" in an extremely low power consumption mode while waiting for additional information to be entered at the keyboard. Such a technique substantially prolongs the period of stand-alone operation of the device when powered by batteries.

The keyboard switch matrix 340 is essentially a matrix of switches, each of which may be individually closed by pressing a corresponding key on the keyboard. According to the illustrated embodiment, the keyboard switch matrix 340 is an 8 by 8 matrix, i.e., a matrix of 64 individual switches, which can accommodate a respective set of 64 keys of a keyboard. The matrix is comprised of 8 column lines, which are connected to the output of the Write Latch 320 and 8 row lines, which are connected to the input of the Read Latch 330. Each of the column lines are preferably provided with a diode between the matrix 340 and the Write Latch 320, in order to prevent a logical high on one line being shorted directly with an adjacent line, particularly in a situation where three keys are pressed simultaneously. If an open collector output Write Latch 320 is used, however, protective diodes probably are not necessary.

When a key is depressed, a switch is closed that connects the particular row and column lines associated with the key. If none of the keys of the keyboard are depressed, the output of each row line of the keyboard matrix 340 is a logic high (1), due to each row line being connected to the positive supply voltage through a 100 K-ohm pull up resistor. When a key is depressed, it closes a switch which, due to a voltage drop across the 100 K-ohm resistor, causes the associated row line to drop to a low logic level (0). This in turn will trigger an interrupt of the microcontroller 230 via the OR-gate, alerting the microcontroller 230 that a key has been pressed and that the keyboard matrix 340 should be scanned to determine which key has been pressed.

Scanning of the keyboard switch matrix 340 to determine which key has been depressed may be performed by a conventional scanning technique which involves writing to the Write Latch 320 a byte, i.e. a byte pattern, with all bits set high, except for one bit which is set low. This single low bit is stored through each bit position of the columns of the matrix 340 by writing and applying the corresponding byte pattern to the Write Latch 320. For example, the byte 0111 1111 is first written to the Write Latch 320 then applied to the columns of the switch matrix 340, then the byte 1011 1111 is written and applied, and, after the Write Latch 320 byte is applied to the matrix 340, the process continues until the byte 1111 1110 is written and applied to the columns of the switch matrix 340.

After each byte pattern from the Write Latch 320 is applied to the switch matrix 340, the rows of the matrix are read via the Read Latch 330. If the value contained within the Read Latch 330 corresponds to the value it initially held immediately after a key press was detected, then the particular switch closed may be determined from the contents of the Write Latch 320 and the Read Latch 330. For example, if the value of the Write Latch 320 is 01111111 and the value of the Read Latch 330 is 01111111, then it is known that the key corresponding to the 8th row and the 8th column has been depressed. Once a key press has been decoded from its row and column designation, the microcontroller 230 determines if it is a control or instruction key, or if it is a data key. In response, if the key press is determined to be data, any conventional technique, such as a look-up table, may be used to store the corresponding ASCII value in RAM memory 250 and display it on the LCD display 200. If the key depressed is determined to be an instruction or other control character, the microcontroller 230 may execute the appropriate associated set of instructions corresponding to the depressed key. As will be described in much greater detail later, the information received by scanning of the keyboard matrix 340 allows data to be stored and edited, as well as providing instructions to the microcontroller 230 to control the sequence of operation or processing.

Power is supplied to the device of the present invention by a power supply circuit 220 that provides for three alternate sources of power. A first power source is a conventional AC/DC adapter 360 that provides a 7 to 12 volt DC power source, which is converted by a regulator 370 to the +5 V power source for the device. This source 360 is available, of course, only when an energized AC/DC power adapter is plugged into the respective input receptacle of the device. Preferably a capacitor is connected, in parallel, between the AC/DC adapter input 360 and the rest of the power circuit in order to smooth undesired current ripples produced by the AC/DC adapter 360 input.

A second power source is the conventional host computer power source 380 provided from the keyboard connector cable. This source 380 is available, of course, only when the device is connected to a host computer by the keyboard connector cable.

A third power source 390 is provided by an on-board battery pack, such as 4 AA size batteries. This power source 390 is available, of course, only if a set of batteries is present.

The voltage regulator 370 serves to convert and maintain the power supplied to the device substantially at +5 V. In addition, a number of diodes are provided to isolate the various power sources and prevent one power source from driving another power source. Although the design of the illustrated embodiment provides that the particular power source with the highest voltage will ultimately end up supplying power to the device, an alternative design may be utilized where one particular power source is selected according to a predetermined priority. For example, a preferred priority scheme may select the keyboard cable power source 380, if connected, then the AC/DC power source 360, if connected, then the on-board battery pack 390 in the event the other two sources 380, 360 are not connected.

The power supply circuit 220 also includes a power switch 400 to turn the device on or off. Coupled between the switch 400 and the +5 V line supplied to the circuit is a capacitor which serves to smooth the voltage when switching the device.

In order to preserve the contents of the RAM 250 when the device is turned off or when the power drops below a predetermined level, a RAM battery backup is connected to the RAM by a voltage switch circuit 410. According to the illustrated embodiment, the RAM battery backup 420 is comprised of a 3 V lithium battery. The lithium battery is automatically activated by the switch circuit 410 whenever the supply voltage drops below 3 V. Thus, the lithium battery serves to preserve the information stored in the RAM in the event the supply voltage drops below 3 V.

Since some conventional RAM chips typically require that, in order to enter into a low power standby mode, the chip enable (CE) pin be maintained at the same voltage as the RAM power line (Vdd), a transistor 430 isolates and effectively disconnects the RAMCS line when the +5 V supply voltage is not available. Therefore, when the supply voltage is disconnected, or the device is otherwise turned off, the 3 V lithium battery voltage is supplied to both the Vdd pin and the RAMCE pin of the RAM chip.

In order to prevent corruption of the contents of the RAM when the power supply voltage is low, two low voltage detection circuits are provided. The first circuit 440 detects when the supply voltage drops below a first predetermined level, such as 4.6 V. The output of this circuit 440 is connected to an input of the microcontroller 230. Normally, the first detection circuit 440 applies a logic 1 to the microcontroller 230 input, indicating that the supply voltage is greater than the first predetermined level. However, when the supply voltage drops below the first predetermined level, the first detection circuit 440 applies a logic 0 to the microcontroller 230 thereby indicating that the supply voltage is low. Preferably, in response to the microcontroller 230 detecting such a logic 0, the microcontroller 230 will be programmed to display a message to the user informing him of the low supply voltage. This message will be displayed until the voltage level rises above the first predetermined level. Alternatively, the user may be informed of the low voltage condition by a separate visual or audible indicator, such as an LED or audible alarm.

A second voltage detection circuit 450 is provided in order to automatically shut down the device when the supply voltage drops below a second predetermined level, such as 4.5 V. Normally, the second detection circuit applies a logic 1 to the RESET pin of the microcontroller 230, indicating that the supply voltage is higher than the second predetermined level. However, when the supply voltage drops below the second predetermined level, the second voltage detection circuit 450 applies a logic 0 to the RESET pin of the microcontroller 230, effectively halting operation of the device. When the supply voltage is restored to a level higher than the second predetermined level, the second detection circuit 450 applies a logic 1 to the RESET pin, initiating operation of the device again.

In order to provide a convenient means for displaying data, such as text being input or edited, as well as prompting the user regarding operation, a small display module 200 is provided. According to the illustrated embodiment, the display 200 consists of a 4-line, 40-column LCD ASCII character display due to its relatively low power consumption characteristics and relatively low cost.

The LCD display 200 is connected to the microcontroller 230 by way of 8 dedicated I/O lines. The I/O lines typically include both data and control lines, such as 4 bits of data and 4 bits of control. In accordance with the illustrated embodiment, the information displayed on the LCD display module 200 is controlled by the signals provided by the microcontroller 230 via the I/O lines.

Although the microcontroller 230 may send signals to display virtually any characters on the LCD display 200, normally the information displayed will correspond substantially to at least a portion, or block, of the data stored in the RAM memory 250. Since the RAM 250 is intended to store text information input through the keyboard, the LCD display 200 will preferably display an "active" portion or block of text being entered or edited by the user. In addition, the display 200 may be used to prompt the user concerning operation of the device or may be used to display useful messages informing the user of operating conditions such as a low power supply.

Information and data is communicated to an attached host computer through one of the two keyboard cable connectors. There is provided a host computer keyboard interface circuit 210a as the gateway to an attached Macintosh type host computer, and there is also provided another host completer keyboard interface circuit 210b as the gateway to an attached PC type host computer. Communications are conducted by any one of a number of standard keyboard interface protocols, depending upon which of the two keyboard connectors that is being utilized. As will be seen, an advantageous feature of the present invention is that it provides a means for determining which of the two possible keyboard connectors is connected to a host computer system. Therefore, the device of the present invention automatically determines which type of host computer to which the device connected and therefore the type of keystroke emulation protocol to use, merely by the fact that one of the keyboard connectors is connected to a keyboard input receptacle of a host computer system.

As depicted in the illustrated embodiment, for the Macintosh type keyboard interface circuit, an Apple Desktop Bus (ADB) protocol may be used to serially transmit data to an attached Macintosh type host computer. In accordance with standard ADB protocol, the keyboard connector cable 460a is comprised of 4 lines, designated as data, reserved, host computer power (+5 V) and host computer ground (0 V). The data line from the connector cable 460a is connected to two different lines of the microcontroller 230. One line, an input, connected through a pull-up resistor, is used by the microcontroller 230 to monitor the status of the connector cable data line. The other line, an output line connected through a resistor and a transistor, is used by the microcontroller 230 to drive the data line when transmitting information. Through this Macintosh type host computer keyboard interface circuit 210a, the device transmits data to an attached Macintosh type host computer using the standard ADB protocol. For additional information regarding the ADB protocol, refer to *Guide to the Macintosh Family Hardware*, (second edition, published by Apple Computer, Inc.), particularly Chapter Eight describing the Apple Desktop Bus.

For the PC type host computer keyboard interface circuit 210b illustrated, a standard PS/2 type six-pin miniature DIN connector 460b is used. As illustrated the conventional DIN connector is comprised of 6 lines, designated as data, reserved, ground (0 V), host computer power (+5 V), clock and reserved. The data line from the connector 460b is connected to two different lines of the microcontroller 230. One line, an input, is used by the microcontroller 230 to monitor the status of the connector cable data line. The other line, an output line, is used by the microcontroller 230 to drive the data line when transmitting information. Similarly, the clock line from the connector 460b is connected to two different lines of the microcontroller 230. One line, a clock in line, is connected through a resistor connected in parallel to ground. The other line, a clock out line, is connected through a transistor to the clock in line. Through this PC type host computer keyboard interface circuit 210b, the device transmits data to an attached PC type host computer using a standard PC type keyboard interface protocol.

As can be seen, the microcontroller 230 is central to the operation and control of the device. Typically, the microcontroller 230 will execute a predetermined set of program instructions stored in the ROM 240, while temporary program variables and input information will be stored in the RAM 250. Usually, during normal operation, the microcontroller 230 will be in a low power "sleep" mode until interrupted by a keystroke signal from the keyboard interface circuit 290. In response, the microcontroller 230 "wakes up" and scans the keyboard matrix 340 to determine which key was pressed.

Generally, when operating in stand-alone mode, the microcontroller 230 stores characters in the RAM 250 corresponding to the keystrokes detected from the keyboard interface circuit 290. When operating in a conventional keyboard mode, the microcontroller transmits, via the appropriate host computer keyboard interface circuit 210a or 210b, characters corresponding to the keystrokes detected from the keyboard interface circuit 290. When operating in automatic mode, the microcontroller 230 transmits, via the appropriate host computer keyboard interface circuit 210a or 210b, a sequence of characters corresponding to the buffer information stored in the RAM 250. As will be clear from the following description of the program control flow, command or control keystrokes detected from the keyboard interface circuit 290 provide a method for switching between the various modes.

Figure 5:
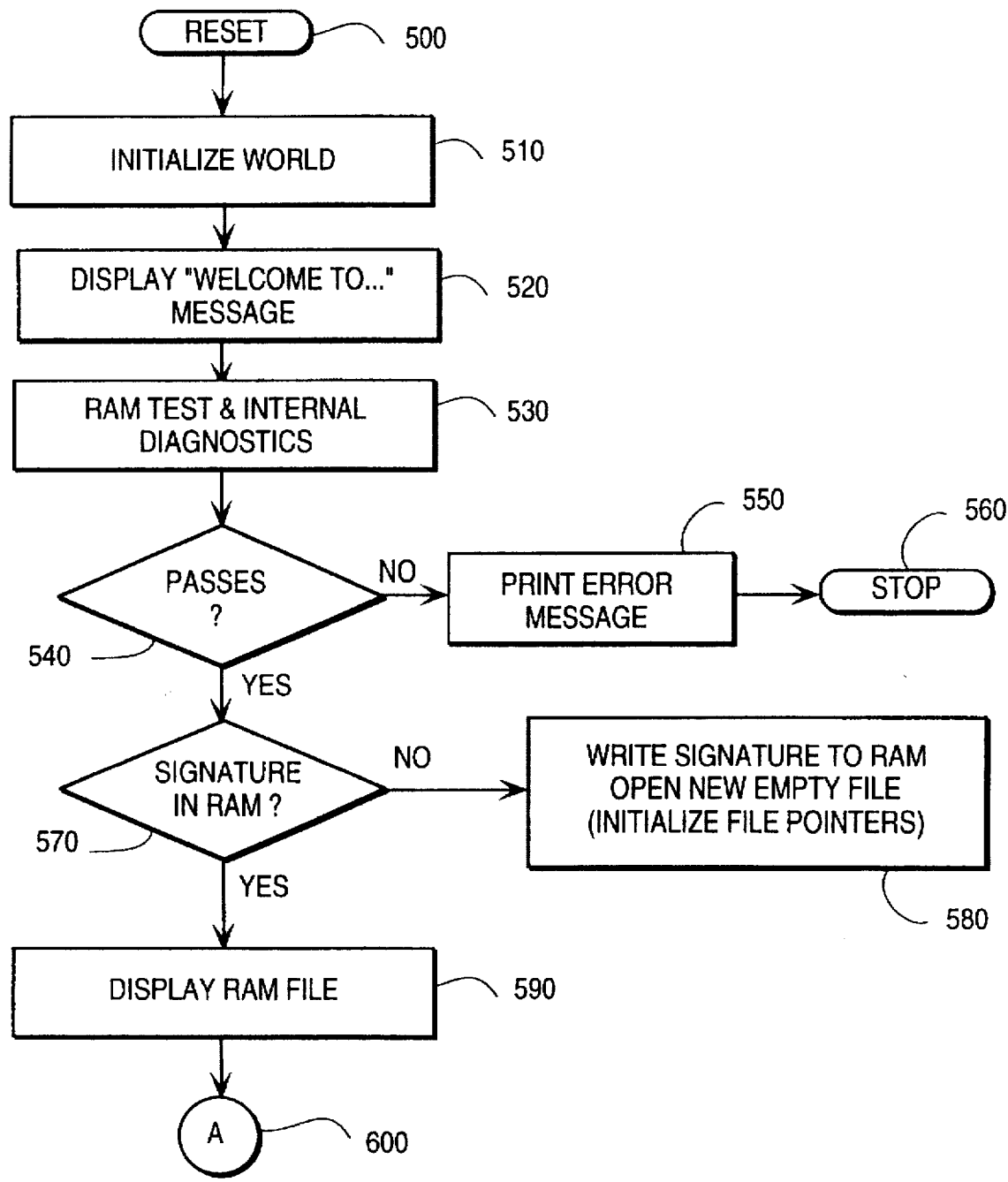
FIG. 5 is a flow chart depicting reset and initialization procedures of a preferred embodiment of the present invention.

Turning now to FIG. 5, there is shown a flow diagram depicting operation of the device of the present invention. It should be noted that the particular sequence of steps comprising FIG. 5, as well as the following flow diagrams, is shown by way of example, and is not intended to limit the invention thereby. In particular, the exemplary embodiment disclosed in the following flow diagrams is implemented using a dual-platform version of the invention where the device may be operated in conjunction with the ADB protocol, if connected to a Macintosh type host computer system, or a PC type protocol, if connected to a PC type host computer system. However, as will be apparent from the accompanying detailed description, the operation may be readily modified to implement other or additional keyboard communication protocols, while still embracing the present invention.

The steps set forth in FIG. 5 represent instructions or sets of instructions, typically read from the ROM, and executed by the microcontroller. Execution commences in Step 500 after the device is reset, such as upon turning the device on. A preliminary initialization sequence is performed in Step 510 and involves tasks such as setting microcontroller internal control and configuration registers, initializing variables and data structures, and initializing the stack pointer. Next, in Step 520, the microcontroller supplies the LCD with the necessary data and control signals to display a welcome message, indicating to the user that the device is turned on.

The RAM is tested in Step 530, such as by a conventional technique of writing then reading a predetermined set of information to each byte in the RAM, verifying that each byte of information read from the RAM corresponds exactly to each byte written to the RAM. Preferably, a non-destructive technique is used (i.e., the contents of each byte is read, tested, then restored) that tests each bit of each address is tested. Also, in Step 530, a number of diagnostics are performed such as a RAM test and interrupt test. If, in Step 540, the testing procedures are unsuccessful, an appropriate error message is displayed in Step 550 and execution is halted in Step 560. Otherwise, if the testing procedures are successfully completed in Step 540, execution proceeds to Step 570.

In Step 570, the RAM memory is tested to determine if a predetermined "signature" is present. This procedure is required in order to determine if this is the first time the unit has ever been turned on. The "signature" will typically consist of a predetermined sequence of bits or bytes stored in a predetermined location in the RAM memory. If the signature is present, this is an indication that the device has been turned on before, and execution proceeds to Step 590. If the signature is not present, however, this is an indication that this is the first time the device has been turned on, and execution proceeds to Step 580. In Step 580, a buffer is allocated to store a text file to be entered and edited by the keyboard. In addition, a file pointer indicated the end of the file is initialized, such as by setting it equal to the beginning of the file, and the predetermined signature is written into the predetermined location in the RAM memory to indicate that the RAM has been initialized, then execution proceeds to Step 590.

In Step 590, the contents of the text buffer or file stored in the RAM memory are displayed on the LCD display of the device. Of course, if the file is empty, the display will appear blank, with the possible exception of a cursor indicating position on the screen. Likewise, if the size of the text file is greater than the number of characters which may be displayed on the LCD display, a portion of the file may be displayed. Typically, the beginning or the end portion of the text file will be displayed initially.

Alternatively, the last "current" portion of the text file that was displayed before the power was turned off may be displayed again. This may be accomplished by reading from the RAM memory one or more pointers that were previously stored, indicating the last "current" position of the text file to be displayed. Of course, this would only be meaningful in the event that the signature was previously located, thereby indicating that there was a previous current location of the text file.

Figure 6:
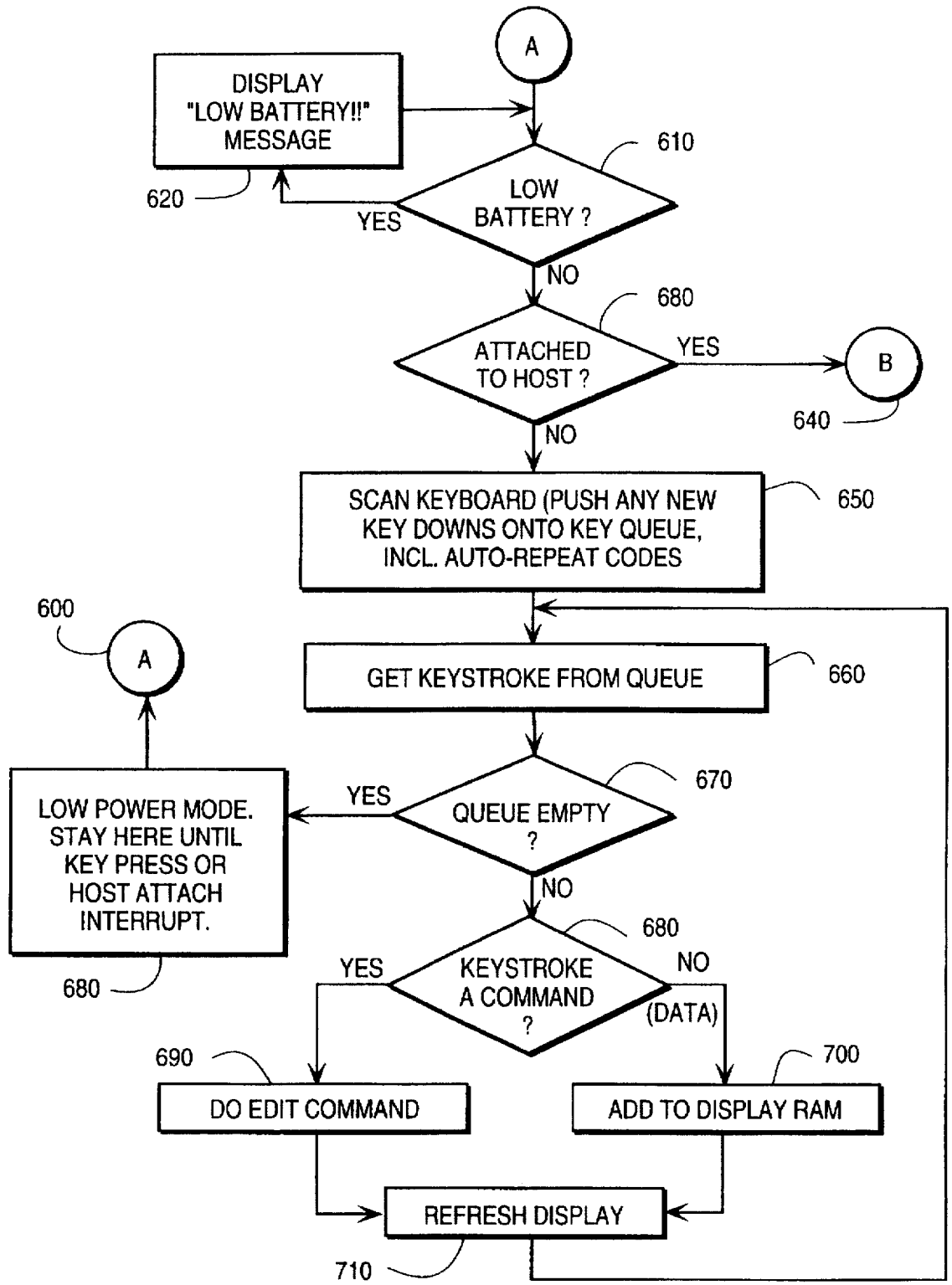
FIG. 6 is a flow chart depicting remote mode operation according to a preferred embodiment of the invention.

After the text file has been displayed in Step 590, the initialization procedures have been completed and execution continues to Step 600 (FIG. 6). Commencing with Step 600 in FIG. 6, the initialization procedures have been completed and processing is devoted primarily to reading keystrokes and transmitting information according to the instructions provided by the user.

In Step 610, it is determined whether the power supply voltage has dropped below a predetermined level. Relating this step to the illustrated embodiment of FIG. 4, the logic of the pin of the microcontroller 230 connected to the first voltage detection circuit 440 is read, indicating whether the supply voltage is above or below the first predetermined level, such as +4.6 V. If it is determined, by the logic of this pin, that the supply voltage is below the first predetermined level, then execution branches to Step 620 where a message is displayed informing the user of the low supply voltage. Otherwise, if the supply voltage is greater than the first predetermined voltage, execution branches to Step 630.

It should be noted that, according to the procedure set forth in FIG. 6, once the low supply voltage is detected in Step 610, the procedure continues in an essentially endless loop, displaying the low power message in Step 620, until the supply voltage is greater than the first predetermined voltage level, as determined in Step 610. Alternatively, the procedure may be modified to provide that the low power message be displayed only once in Step 620, then the display would be restored to display the current portion of the text file and processing would continue to Step 630. According to this modified procedure, the user would be informed once of the low supply voltage and would then be able to complete a few tasks, such as transferring the text file or inserting new batteries, before the device is automatically shut off in response to a reset activated when the supply voltage drops below the second predetermined voltage level.

In Step 630, the microcontroller determines if the device is currently connected to a host computer. The device determines if either of the keyboard connectors 460a or 460b is attached by monitoring the appropriate input lines from the connector. For example, the voltage on the host power line may be checked; if connected, the host computer will be supplying a positive voltage to the host power line from the connector. According to an alternatively arrangement, the clock in line may be monitored to determine if the connector is connected to a host computer. Generally, if the input clock lines are "silent", or if the host power line is low, the connector is not connected to a host computer system. Thus, by monitoring these data input lines, the microcontroller is able to determine if either of the connectors is connected.

In Step 641 the device determines if it is attached to a Macintosh type host computer or a PC type host computer by "listening" to the data line of the keyboard cable for a short period. If the keyboard cable is connected to a Macintosh type host computer, according to the ADB protocol there will be activity on the data line, i.e., the logic state will be changing approximately about every 10–14 ms. and in response to detecting such activity, an "attached to Macintosh" flag is set, "Connected to Macintosh" is displayed in Step 642 and execution branches to Step 730 to execute instructions relating to device modes when connected to a Macintosh type host computer. If, in Step 640, there is no such activity on the data in line, the host computer system is a PC type host computer, an "attached to PC" flag is set, "Connected to PC" in Step 643 and execution branches to Step 730 to execute instructions relating to device modes when connected to a PC type host computer.

If, however, in Step 680, it is determined that the device is not attached to a host computer, the procedure branches to Step 650 where the microcontroller scans the keyboard switch matrix to determine which key, if any, has been pressed. If it is determined that a key has been pressed, i.e., a closed switch has been detected, a code corresponding to the key is added to a queue stored in the RAM to be processed during subsequent steps. In accordance with a preferred embodiment of the invention, an auto-repeat feature will be implemented in the set of instructions executed by the microcontroller. Such a feature would involve determining the relative time period a particular key has been depressed. If the time period is less than a predetermined period, it is assumed that the user intended to activate the particular key only once. Thus, since Step 650 will likely be executed many times during any individual key press, if the detected depressed key corresponds to the previously detected depressed key and the relative time period is less than the predetermined period, the microcontroller will not add another character to the queue since this second detection actually corresponds to a single keystroke that was already entered in the queue. If, however, the relative time period between identical detected depressed keys is greater than the predetermined period, then in Step 650 it is assumed that the user intended to activate the auto-repeat feature by keeping the key depressed, and in response, the microcontroller adds another of the same character to the queue and begins timing again. After the auto-repeat feature has been activated for one particular key, a shorter predetermined time period may be used to facilitate the auto-repeat process until a different, or no keystroke is detected.

After the keyboard switch matrix has been scanned in Step 650, execution proceeds to Step 660 where the next code to be processed from the queue is read. It should be noted that the queuing process is a first-in-first-out (FIFO) process, whereby the codes from the queue are processed in the order in which they were added to the queue.

Next, in Step 670, if the read from the queue in Step 660 was unsuccessful because the queue was empty, the procedure branches to Step 680 where the microcontroller enters a low power mode. The procedure essentially dwells in the low power mode in Step 680 until the microcontroller is interrupted by a closed keyboard switch matrix switch or connection of the device to a host computer. Upon an interrupt in Step 680, the microcontroller exits the low power mode and execution of the procedure loops back to Step 600.

If, in Step 670, the queue is not empty and a code has successfully been read from the queue, the procedure branches to Step 680 where the microcontroller tests the code to determine if it is a command or if it is data. Each key of the keyboard switch matrix is categorized as either a command key or a data key. Data keys typically correspond to standard characters, numbers and symbols. Command keys typically correspond to those keys that are intended to instruct the device to perform a specific function, such as edit the text file stored in the RAM. Examples of command keys are the delete and backspace keys, and the "arrow" keys that instruct the device to move the cursor on the display and correspondingly update the pointer indicating the "current" character in the text file buffer.

If, in Step 680, the keystroke code is determined to be a data code, the procedure branches to Step 700 where the code is added to the text file buffer stored in RAM. Otherwise, if in Step 680, the keystroke code is determined to be a command, the procedure branches to Step 690 where the microcontroller performs the function corresponding to the command, such as editing or otherwise updating the text file buffer.

After a keystroke code is processed, either in Step 690 as a command or in Step 700 as data, the display is refreshed in Step 710 to reflect any changes that may have been made to the text file buffer stored in RAM. Next, the procedure loops back to Step 660 to process another code from the keystroke queue.

If, in Step 630, it is determined that the device is attached to a host computer, the procedure branches to Step 640 to execute a set of instructions relating to device modes when attached to a host computer. Generally, there are two such "attached to host" modes—one mode involves operation of the device in conjunction with the host computer substantially as a conventional keyboard, while the other mode, the "automatic" mode, involves automatically transmitting to the host computer, via a keystroke emulation technique, the contents of the text file buffer stored in RAM.

Figure 7:
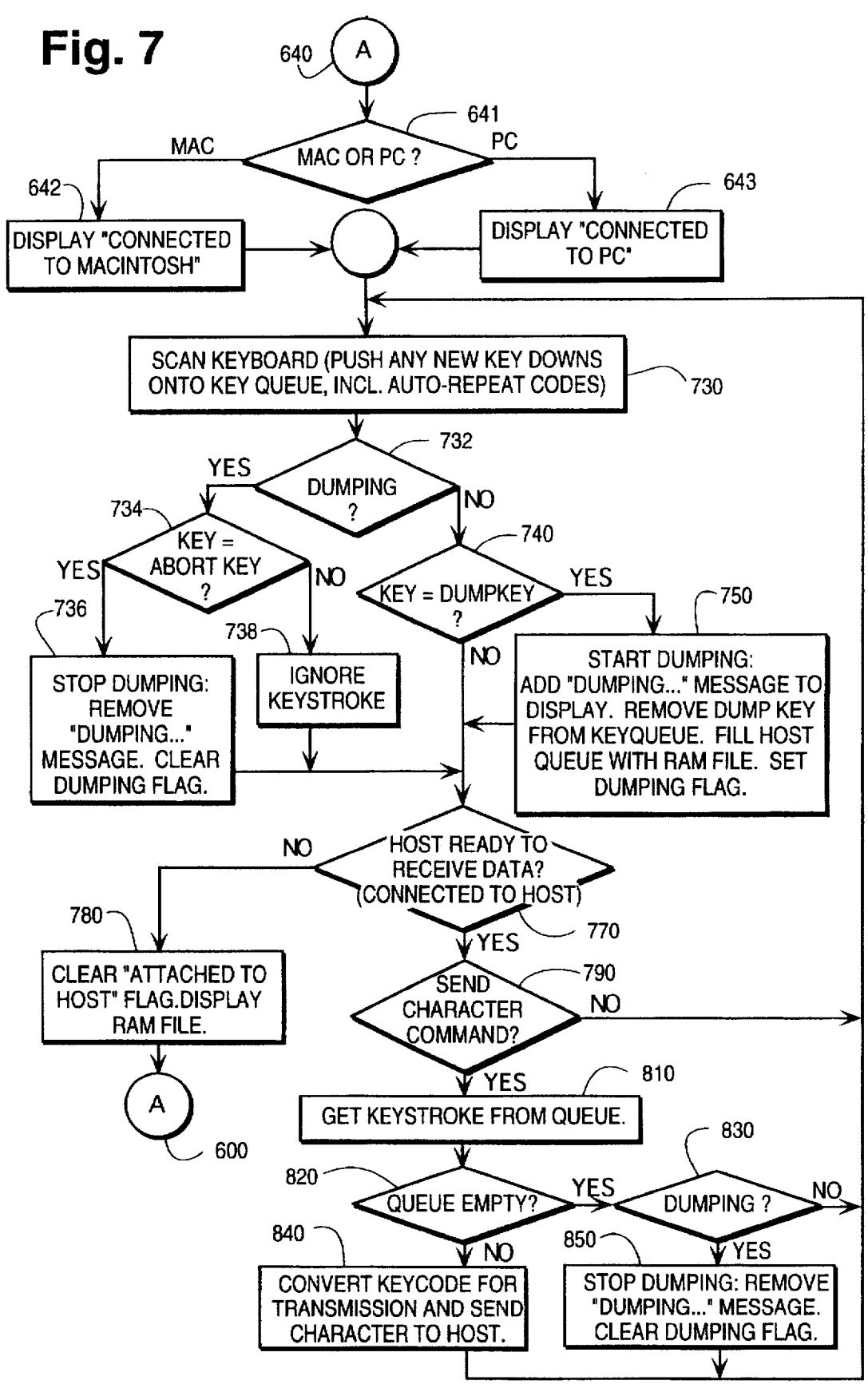
FIG. 7 is a flow chart depicting automatic and host mode operation according to a preferred embodiment of the invention.

From Step 640 in FIG. 7 (same as Step 640 in FIG. 6), after determining which type of host computer the device is presently attache to, the procedure continues to Step 730 where the microcontroller scans the keyboard switch matrix to determine if any keys have been depressed. As described with respect to Step 650 (FIG. 6), keystroke codes corresponding to any new keystrokes or auto-repeat keystrokes are added to the keystroke queue to be processed during subsequent steps.

Next, in step 732, the "dump" flag is tested to determine if the device is currently in automatic mode, transmitting information to the host computer. If the "dump" flag is set, the procedure branches to Step 734 to determine if the last key pressed was an "abort" key, indicating that transmission to the host computer should be terminated. If the abort key was pressed, the procedure branches to Step 736 where the dumping message is removed from the display and the dump flag is cleared to indicate that the device is no longer in the automatic mode, then execution branches to Step 770.

If, in Step 734, the last key pressed was not the abort key, the procedure branches to Step 338 where keystroke, which was pressed during automatic transmission mode, is ignored. As should now be apparent, when the device is operating in automatic mode, the only keystroke that will affect operation is the abort key. After the keystroke is ignored in Step 738, the procedure branches to Step 770.

If, in Step 732, it is determined that the device is not currently in automatic mode, the procedure branches to Step 740 where the last keystroke detected is tested to determine if it corresponds to the predetermined "dump" key, instructing the device to transmit the text file buffer stored in RAM to the attached host computer. If the last keystroke detected is the dump key, the procedure branches to Step 750 where a message is displayed on the device display indicating the automatic transmission process has commenced. In addition, in Step 750, the last keystroke, i.e., the dump key, is removed from the keystroke queue, a flag is set indicating the dumping process is active and a transmit queue is set up and filled with all the characters comprising the text file stored in RAM. Setting up and "filling" such a transmit queue, of course, may rather easily be accomplished by initializing a pointer that points to the address of the beginning of the text file.

If the dump key was not present in Step 740, or upon the completion of Step 750, the procedure continues to Step 770 where the microcontroller waits a predetermined time period for a signal from the host computer indicating it is ready to receive data. If a "ready to receive data" signal was not received from the host computer in Step 770, it is assumed that the host computer was disconnected and the procedure branches to Step 780. In Step 780, the "attached to host" flag is cleared and the RAM text file is displayed in preparation for entering the stand-alone mode when the procedure loops back to Step 600.

Otherwise, if in Step 770, it is determined that the "ready to receive" signal was received from the host computer, the procedure branches to Step 790.

In Step 810, a character is read from the transmit queue, and if in Step 820 it is determined that the transmit queue is empty, the procedure branches to Step 830; otherwise, the procedure branches to Step 840.

In Step 840 the character read from the transmit queue is converted into the appropriate form for transmission and is transmitted to the host computer according to the keyboard protocol used by the host computer.

If the queue was found to be empty in Step 820, the dumping flag is tested in Step 730 and if it is not set, the procedure loops back to Step 730 to scan the keyboard; otherwise, the procedure branches to Step 850 where the display is updated to indicate the transmission has been completed, the dumping flag is cleared and the procedure loops back to Step 730 to scan the keyboard.

As can be seen from the foregoing detailed description, the invention provides a portable computer keyboard capable of being operated in a stand-alone mode, an automatic mode and a conventional mode. In stand-alone mode, information entered is stored in an on-board memory buffer, and may be edited by using a set of predetermined editing keys in conjunction with a display mounted on the device. In automatic mode, the contents of the on-board memory buffer are transmitted, by a keystroke emulation technique, to an attached host computer via a conventional keyboard connector cable. In the conventional keyboard mode, keystrokes entered are transmitted directly to an attached host computer.

What is claimed is:

1. A portable computer keyboard device having a data buffer and at least one keyboard connector adapted to connect the device to any one of a plurality of different types of host computers wherein each type of host computer uses a different data protocol and has a keyboard input receptacle, said device comprising:

at least one means for connecting said keyboard connector to said keyboard input receptacle of said host computers;

a first mode means for operating said device as a conventional keyboard, when said keyboard connector is connected to said keyboard input receptacle of said host computer, whereby a sequence of keystroke information signals having any one of a plurality of data protocols and relating to a respective sequence of individual keystrokes is directly generated on said keyboard connector and wherein said first mode means capable of detecting said keyboard connector being connected to any of said plurality of host computers;

a second mode means for operating said device in a stand-alone manner whereby a sequence of data relating to a respective sequence of individual keystrokes is stored in said data buffer; and a third mode means for operating said device in an automatic manner, when said keyboard connector is connected to said keyboard input receptacles of said host computer, whereby a sequence of keystroke information signals having any one of a plurality of data protocols is generated on said keyboard connector relating to a respective sequence of data stored in said data buffer and wherein said third mode means includes circuitry that is capable of detecting said type of host computer to which said device is connected according to the data protocol used by said host computer.

2. A keyboard device having a data buffer and at least one keyboard connector adapted to connect the device to any one of a plurality of different types of host computers wherein each type of host computer uses a different data protocol and has a keyboard input receptacle, said device comprising:

at least one means for connecting said keyboard connector to said keyboard input receptacle of said host computers;

an input means;

means for receiving data from said input means;

means for operating said device remote from said host computer thereby directing data from said receiving means into said data buffer;

a means for generating, when said keyboard connector is connected to said keyboard input receptacle of said host computer a sequence of signals having any one of a plurality of data protocols corresponding to and in response to data received directly from said receiving means, wherein said sequence of signals represent keystroke information corresponding to said data received and wherein said data protocol corresponds to the data protocol accepted by said host computer;

a means for automatically retrieving data stored in said data buffer, when said keyboard connector is connected to said keyboard input receptacle of said host computer, and said generating means generates said sequence of signals on said keyboard connector;

a means for detecting said keyboard connector being connected to said keyboard input receptacle of said host computer wherein said detecting means includes circuitry to identify said type of host computer according to said data protocol of said host computer.

3. The keyboard device according to claim 2 wherein said circuitry identifies an ADB-type data protocol which is used by said host computer.

4. The keyboard device according to claim 2 wherein said circuitry identifies a PC-type data protocol which is used by said host computer.

5. The keyboard device according to claim 2 wherein said at least one connecting means connects a first of said keyboard connectors to a first of said plurality host computers and a second of said keyboard connector connects a second of said keyboard connectors to a second of said plurality host computers.

6. The keyboard device of claim 2 wherein said input means is a digital keypad.

7. The keyboard device of claim 2 further comprising means for displaying data stored in said data buffer.

8. The keyboard device of claim 2 further comprising means for editing the data stored in said data buffer in response to predetermined data received from said input means.

9. The keyboard device of claim 2 further comprising power supply means for supplying a regulated direct current power source for said device.

10. The keyboard device of claim 9 wherein said power supply means is supplied with a plurality of power sources including at least one on-board source and one externally supplied source.

11. The keyboard device of claim 10 wherein one of said plurality of power sources is selected to be used by said power supply means, and wherein said selection is made according to a predetermined priority among said plurality of power sources.

12. The keyboard device of claim 11 wherein said predetermined priority is based upon the relative voltages of said plurality of power sources.

13. The keyboard device of claim 12 wherein said predetermined priority is based upon whether said one of said plurality of power sources is said at least one on-board power source or said at least one externally supplied power source.

14. The keyboard device of claim 9 further comprising a first detection means for detecting when said regulated direct current power source supplied by said power supply means is less than a first predetermined power level, and in response to detecting said power supply means being less than said first predetermined low power detection indicating that a low power level has been detected.

15. The keyboard device of claim 9 further comprising a second detection means for detecting when said regulated direct current power source supplied by said power supply means is lower than a second predetermined power level, and in response to detecting said power supply means being less than said second predetermined low power detection halting operation of said device until said regulated direct current power source supplied by said power supply means is not lower than said second predetermined power level.

16. The keyboard device of claim 2 further comprising means for operating said device at a low power consumption level during periods when data is not being received by said receiving means from said input means.

17. A portable computer keyboard device having a data buffer and at least one keyboard connector adapted to connect the device to any one of a plurality of different types of host computers wherein each type of host computer uses a different data protocol and has a keyboard input receptacle, said device comprising:

at least one means for connecting said keyboard connector to said keyboard input receptacle of said host computers;

a first mode means for operating said device in a stand-alone manner whereby a sequence of data relating to a respective sequence of individual keystrokes is stored in said data buffer; and a second mode means for operating said device in an automatic manner, when said keyboard connector is connected to said keyboard input receptacles of said host computer, whereby a sequence of keystroke information signals having any one of a plurality of data protocols is generated on said keyboard connector relating to a respective sequence of data stored in said data buffer and wherein said second mode means includes circuitry that is capable of detecting said type of host computer to which said device is connected according to the data protocol used by said host computer.

18. The keyboard device according to claim 17 wherein said circuitry identifies an ADB-type data protocol which is used by said host computers.

19. The keyboard device according to claim 17 wherein said circuitry identifies a PC-type data protocol which is used by said host computer.

20. The keyboard device according to claim 17 wherein said connecting means connects a first of said keyboard connectors to a first of said plurality of host computers and said connecting means connects a second of said keyboard connectors to a second of said plurality of host computers.

21. The portable keyboard device of claim 17 further comprising means for selectively switching operation of the device among said first mode means and said second mode means.

22. The portable keyboard device of claim 17 further comprising means for displaying data corresponding to at least a portion of the data stored in said data buffer.

23. The portable keyboard device of claim 17 further comprising means for editing the contents of said data buffer responsive to a predetermined set of keystrokes.

24. The keyboard device of claims 17 further comprising power supply means for supplying a regulated direct current power source for said device.

25. The keyboard device of claim 24 wherein said power supply means is supplied with a plurality of power sources including at least one on-board source and one externally supplied source.

26. The keyboard device of claim 25 wherein one of said plurality of power sources is selected to be used by said power supply means, and wherein said selection is made according to a predetermined priority among said plurality of power sources.

27. The keyboard device of claim 26 wherein said predetermined priority is based upon the relative voltages of said plurality of power sources.

28. The keyboard device of claim 25 wherein said at least one externally supplied power source is provided by said first and second host computer via said keyboard connector, and wherein the power source selected by said power supply means is said at least one externally supplied power source used by said device when operated in said first mode means and said third mode means.

29. The keyboard device of claim 17 further comprising means for operating said device in a low power consumption mode when said device is operated in said second mode means during periods when keystrokes are not available for storing in said data buffer.

* * * * *